(12) United States Patent
Matsuda et al.

(10) Patent No.: US 9,895,950 B2
(45) Date of Patent: Feb. 20, 2018

(54) TORSION BEAM SUSPENSION (71) Applicant: Yorozu Corporation, Yokohama (JP)

(72) Inventors: Koji Matsuda, Yokohama (JP); Keizo Hatanaka, Yokohama (JP)

(73) Assignee: Yorozu Corporation, Yokohama (JP)

( * ) Notice: Subject to any disclaimer, the term of this patent is extended or adjusted under 35 U.S.C. 154(b) by 0 days.

(21) Appl. No.: 15/129,493

(22) PCT Filed: Mar. 27, 2014

(86) PCT No.: PCT/JP2014/059024
§ 371 (c)(1),
(2) Date: Sep. 27, 2016

(87) PCT Pub. No.: WO2015/145698
PCT Pub. Date: Oct. 1, 2015

(65) Prior Publication Data
US 2017/0106713 A1 Apr. 20, 2017

(51) Int. Cl.
*B60G 21/05* (2006.01)

(52) U.S. Cl.
CPC ........ *B60G 21/051* (2013.01); *B60G 2200/23* (2013.01); *B60G 2206/014* (2013.01); *B60G 2206/0122* (2013.01); *B60G 2206/20* (2013.01); *B60G 2206/203* (2013.01); *B60G 2206/722* (2013.01); *B60G 2206/81* (2013.01);
(Continued)

(58) Field of Classification Search
CPC .......................... B60G 21/051; B60G 2206/20
See application file for complete search history.

(56) References Cited

U.S. PATENT DOCUMENTS 4,165,099 A * 8/1979 Wagner ................ B60G 21/051
267/191
5,409,254 A * 4/1995 Minor .................... B60G 9/003
267/190

(Continued)

FOREIGN PATENT DOCUMENTS

JP     2009501113 A    1/2009
JP     2010208549 A    9/2010
WO  WO-2012011482 A1  1/2012

OTHER PUBLICATIONS

International Search Report (English translation) for PCT/JP2014/059024 dated Jun. 10, 2014.
(Continued)

*Primary Examiner* — James A English
(74) *Attorney, Agent, or Firm* — Drinker Biddle & Reath LLP (57) ABSTRACT The present invention is a torsion beam suspension 100 including an upper member 10 and a lower member 20, and including right and left trailing arms 50 configured to include a pair of trailing arm configuration members 11 and the pair of lower members and configured to extend in a longitudinal direction of a vehicle body and to be swingable in a vertical direction and a torsion beam 16 which is disposed between the right and left trailing arm configuration members of the upper member 10. The lower member includes an upper connection 21 and a beam joint portion 22 inclined from the upper connection 21 to a bottom portion of the U-shaped cross section of the torsion beam and joined with the torsion beam.

5 Claims, 10 Drawing Sheets (52) U.S. Cl.
CPC ............ *B60G 2206/8109* (2013.01); *B60G 2206/8201* (2013.01)

(56) References Cited

U.S. PATENT DOCUMENTS

| | | | | |
|---|---|---|---|---|
| 5,909,888 | A * | 6/1999 | Betz | B60G 21/051 280/124.166 |
| 7,204,498 | B2 * | 4/2007 | Alesso | B60B 35/007 280/124.106 |
| 7,284,765 | B1 * | 10/2007 | Inoue | B60G 21/051 280/124.166 |
| 7,556,272 | B2 * | 7/2009 | Marchel | B60G 21/051 280/124.103 |
| 7,878,518 | B2 | 2/2011 | De Pompignan | |
| 8,646,789 | B2 | 2/2014 | Ohdo et al. | |
| 2013/0214504 | A1 * | 8/2013 | Ohdo | B60G 21/051 280/124.106 |
| 2016/0068035 | A1 * | 3/2016 | Rao | B60G 21/051 280/124.166 |

OTHER PUBLICATIONS

International Search Report (in Japanese) with Written Opinon of the International Searching Authority for PCT/JP2014/059024 dated Jun. 10, 2014.

European Search Report for Application No. EP 14 88 6723, dated Mar. 13, 2017.

* cited by examiner

TORSION BEAM SUSPENSION

CROSS-REFERENCE TO RELATED APPLICATIONS

This application is a national stage application (under 35 U.S.C. § 371) of PCT/JP2014/059024, filed Mar. 27, 2014, which is incorporated herein by reference in its entirety.

TECHNICAL FIELD

The present invention relates to a torsion beam suspension suspending wheels of a vehicle with a suspension having a torsion beam.

BACKGROUND ART

A torsion beam suspension generally has a torsion beam disposed between a pair of right and left trailing arms disposed in the lateral direction of the vehicle.

A trailing arm includes right and left portions when an upper member in a U-shaped cross section is mounted on a vehicle and a lower member disposed to close the opening of the U-shaped cross section. A hollow structure is formed by the right and left portions of the upper member and the lower member, and a central portion of the upper member is configured as a torsion beam (see Patent Literature 1).

CITATION LIST

Patent Literatures

Patent Literature 1: JP-2010-208549 A

SUMMARY OF INVENTION

Technical Problem

The trailing arm is provided with an attachment point of the vehicle body and a tire connection portion, and a closed cross section is formed by the right and left portions of the upper member and the lower member, whereas the torsion beam has a shape such as a beam just as indicated by its name. Therefore, from the trailing arm to the torsion beam, the shapes of the attachment point of the vehicle body and the tire connection portion are combined toward the torsion beam. In the shapes as described above, the cross sectional shape is likely to change rapidly, and the rigidity from the trailing arm to the torsion beam tends to change rapidly. In addition, a stress may concentrate on the rapid change portion of the cross section, and a crack is likely to be generated in the main body of the torsion beam and a welding portion therearound. Therefore, it is necessary to take measures for that portion in order to cope with the stress concentration.

Accordingly, the present invention is an invention made to solve the above problem, and it is an object of the present invention to provide a torsion beam suspension capable of preventing a rapid change in rigidity at a connection portion between a trailing arm and a torsion beam.

Solution to Problem

The present invention achieving the above object is a torsion beam suspension including a first member having an opening in which a cross section is formed in a U shape and a pair of second members coming into contact with the first member at an edge portion of a U-shaped cross section of the first member and disposed in a lateral direction when mounted on a vehicle. The torsion beam suspension includes right and left trailing arms configured to include a pair of configuration member disposed at right and left when the first member is mounted on the vehicle and the pair of second members, and configured to extend in a longitudinal direction of a vehicle body and to be swingable in a vertical direction and a U-shaped torsion beam which is disposed between the pair of configuration member of the first member and in which a cross section has an opening. The second member includes a closing portion for closing the opening of the configuration member and a joint portion inclined from the closing portion to a bottom portion of the U-shaped cross section of the torsion beam and joined with the torsion beam.

Advantages of the Invention

According to the torsion beam suspension of the present invention, the second member is configured to include a closing portion and a joint portion. Therefore, a rapid change in a cross section joining the trailing arm portion constituted by the closed cross section and the torsion beam constituted by the open cross section is suppressed by the joint portion of the second member, and a rapid change in the rigidity from the trailing arm to the torsion beam can be prevented.

BRIEF DESCRIPTION OF DRAWINGS

FIG. 1 (A) and FIG. 1 (B) are schematic perspective views illustrating a torsion beam suspension according to an embodiment of the present invention.

FIG. 2 (A) and FIG. 2 (B) are a top view, a bottom view, respectively, illustrating the same suspension.

FIG. 6 (A) to FIG. 6 (C) are a perspective view, a top view, and a side view, respectively, illustrating an upper member constituting the same suspension.

FIG. 7 (A) to FIG. 7 (D) are a side view, a front view, a perspective view, and a bottom view, respectively, illustrating a lower member constituting the same suspension.

FIGS. 10 (A) and 10 (B) are a partial perspective view and a partial bottom view, respectively, according to a modification of a lower member.

DESCRIPTION OF EMBODIMENTS

An embodiment according to the present invention will be hereinafter explained with reference to appended drawings. The following description is not intended to limit the technical scope and the meaning of the words described in the claims. The dimensions and ratios in the drawings are exaggerated for the sake of explanation, and may be different from the actual ratios.

Figure 1A:
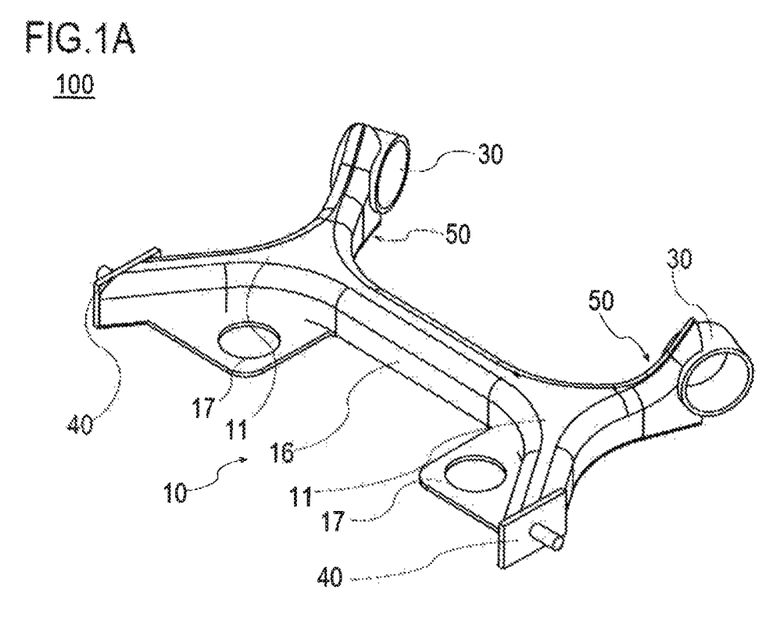
Figure 1B:
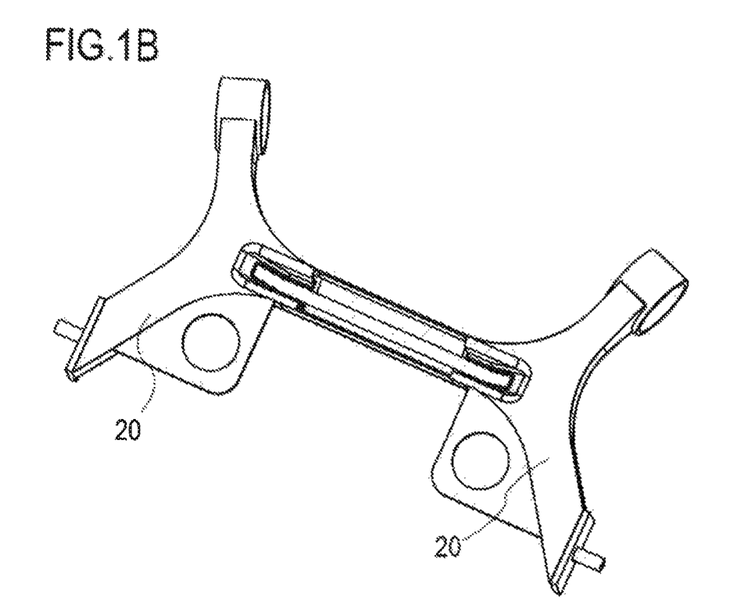
Figure 2A:
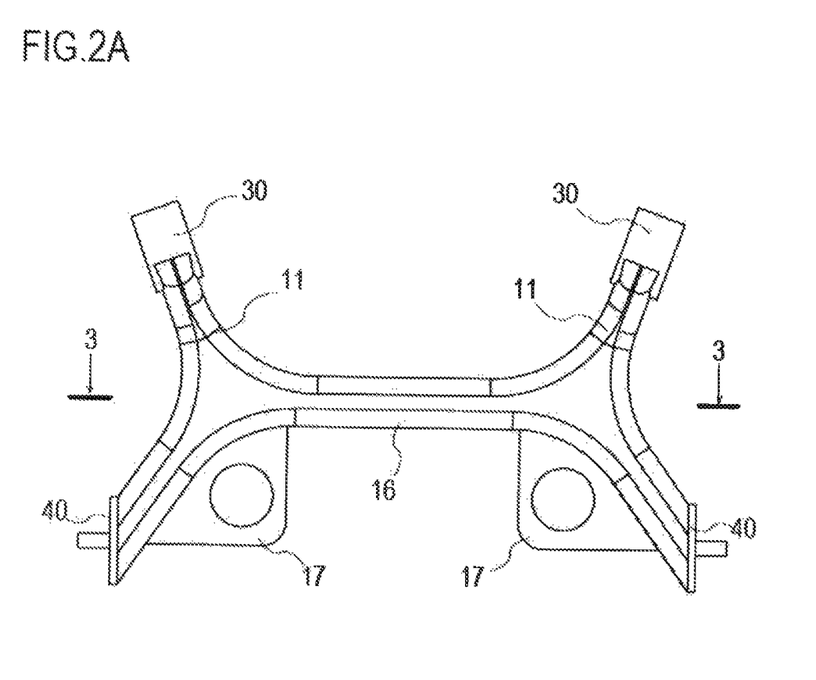
Figure 2B:
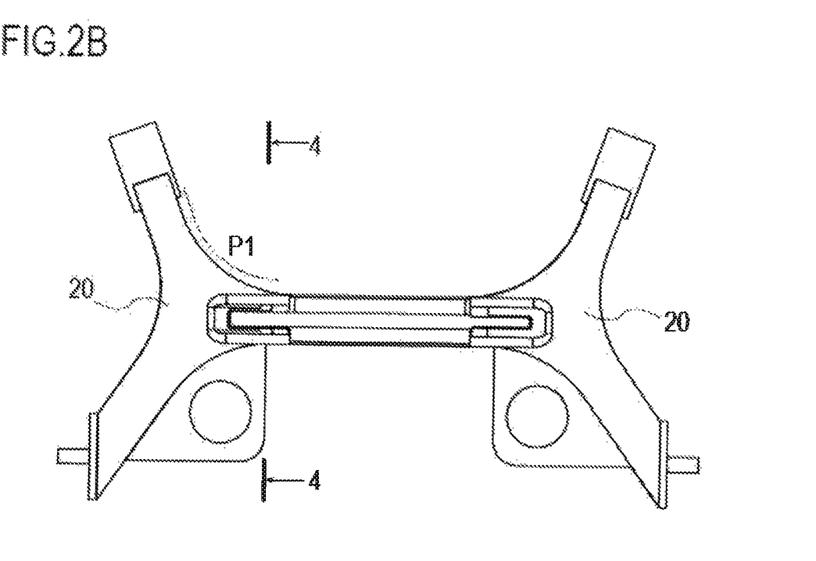
Figure 3:
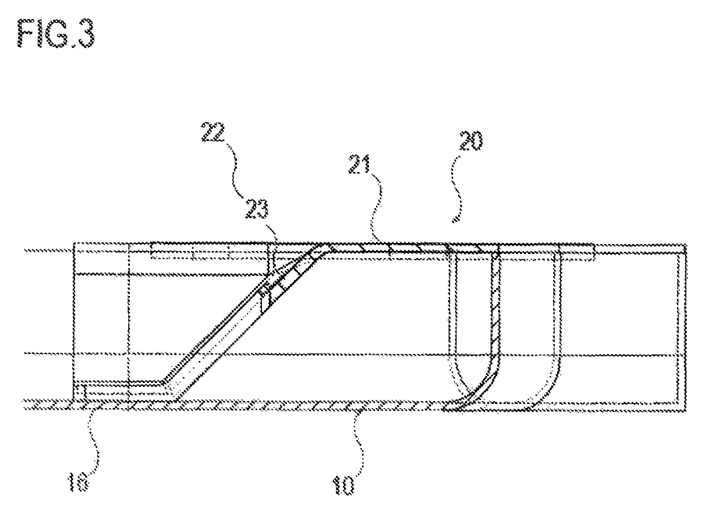
FIG. 3 is a partial cross sectional view taken along line 3-3 of FIG. 2 (A).
Figure 4:
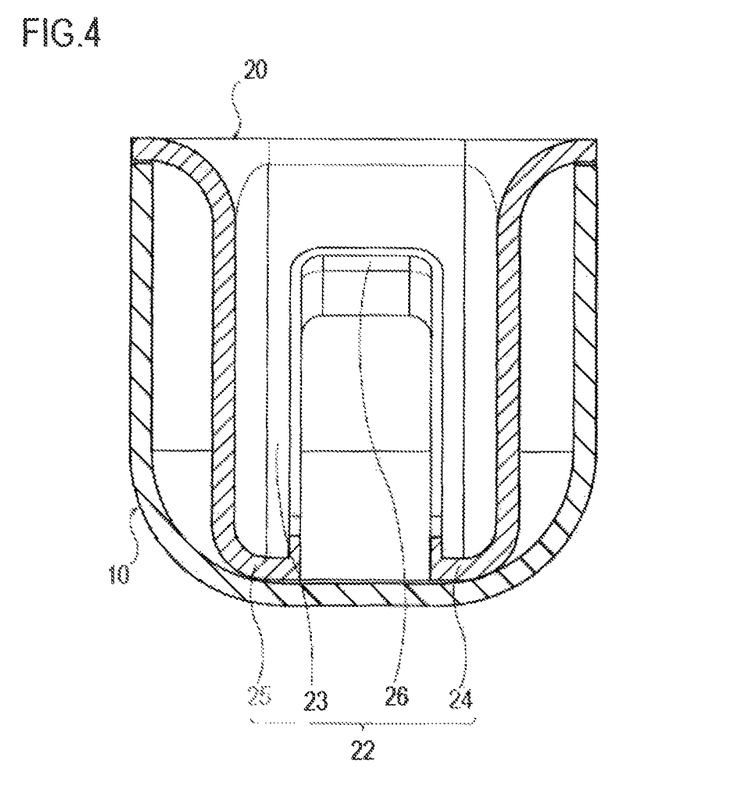
FIG. 4 is a cross sectional view taken along line 4-4 of FIG. 2 (B).
Figure 5:
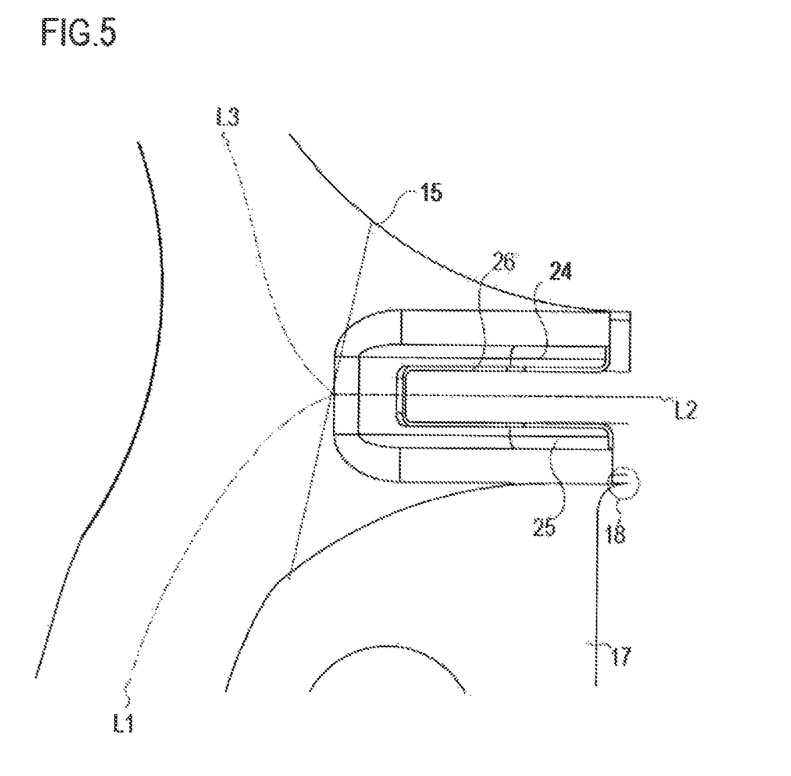
FIG. 5 is an enlarged view illustrating a connection between a trailing arm and a torsion beam.
Figures 6A, 6C:
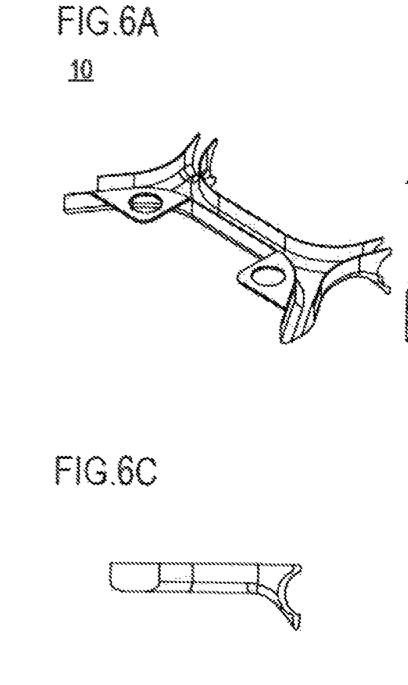
Figure 6B:
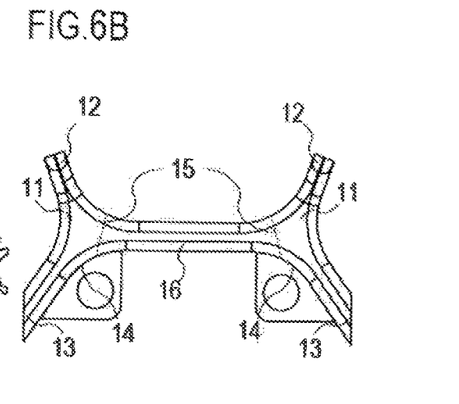

FIG. 1 (A) and FIG. 1 (B) are schematic perspective views illustrating a torsion beam suspension according to an embodiment of the present invention. FIG. 2 (A) and FIG. 2 (B) are a top view, a bottom view, respectively, illustrating the same suspension. FIG. 3 is a cross sectional view taken along line 3-3 of FIG. 2 (A). FIG. 4 is a cross sectional view taken along line 4-4 of FIG. 2 (B). FIG. 5 is an enlarged view illustrating a connection between a trailing arm and a torsion beam. FIG. 6 (A) to FIG. 6 (C) are a perspective view, a top view, and a side view, respectively, illustrating an upper member constituting the same suspension. FIG. 7 (A) to FIG. 7 (D) are a side view, a front view, a perspective view, and a bottom view, respectively, illustrating a lower member constituting the same suspension.

A torsion beam suspension 100 according to the present embodiment is a rear suspension suspending rear wheels of a vehicle of an FF (front engine front drive) and the like. As illustrated in FIG. 1 (A), the suspension 100 includes an upper member 10 (corresponding to a first member), a pair of lower members 20 (corresponding to a second member), a collar 30, and a spindle 40.

The upper member 10 includes a pair of trailing arm configuration members 11, a torsion beam 16, and a pair of spring seat 17. Trailing arms 50 are constituted by the pair of trailing arm configuration members 11, the pair of lower members 20, the pair of collars 30, and the pair of spindles 40. As illustrated in FIG. 2 (A) and the like, the trailing arms 50 are disposed symmetrically at both ends of the torsion beam 16 in the lateral direction of the vehicle.

As illustrated in FIG. 6 (B) and the like, the trailing arm configuration member 11 includes a vehicle body connection 12, a tire connection 13, a spring connection 14, and a beam connection 15. The vehicle body connection 12 is formed at the forward side when mounted on the vehicle. The vehicle body connection 12 is joined with a collar 30, and a bush is attached to the collar 30.

The tire connection 13 is formed at the rear side when mounted on the vehicle, and the spindle 40 is attached thereto, and a constituent component of a tire is connected to the spindle 40. The spring connection 14 are formed at the inside in the lateral direction when mounted on the vehicle, and the spring seat 17 is joined with the corresponding portion. The beam connection 15 is a connection portion with the torsion beam 16. The trailing arm configuration member 11, the torsion beam 16, and the spring seat 17 are constituted by tailored blanks made by joining plate members having different plate thicknesses. The plate members in the portions of the trailing arm configuration member 11 and the torsion beam 16 are formed to have different plate thicknesses, and this portion corresponds to the beam connection 15. Since the beam connection 15 is configured as described above, the rigidity from the trailing arm 50 to the torsion beam 16 is adjusted.

As illustrated in FIG. 6 (A), the upper member 10 is formed in a U-shape in which a cross section has an opening by press forming. In the cross sectional shape of the upper member 10, the shapes are combined toward the inside from the vehicle body connection 12 and the tire connection 13, and the shape of the cross section is formed to continuously decrease toward the connection with the torsion beam 16. In this specification, a portion where the U-shaped cross sectional shape starts to change from the torsion beam 16 to the trailing arm configuration member 11 will be referred to as a cross sectional shape change portion 18 (see FIG. 5). The cross sectional shape of the connection between the torsion beam 16 and the trailing arm configuration member 11 is configured to continuously change as described above, so that the change of the rigidity from the trailing arm 50 to the torsion beam 16 is adjusted. The trailing arm 50 is joined with the spring seat 17 at the inside of the vehicle.

The lower member 20 has the same contour as the trailing arm configuration member 11 in a top view or a bottom view. As illustrated in FIG. 7 (A) to FIG. 7 (D), the lower member 20 includes an upper connection 21 (corresponding to a closing portion) and a beam joint portion 22 (corresponding to a joint portion). The upper connection 21 is a portion connected to the trailing arm configuration member 11 and closing the opening of the U-shaped cross section, and in the present embodiment, the upper connection 21 is formed substantially in a plane, but the shape of the upper connection 21 may be an undulating shape other than the above.

Figure 7A:
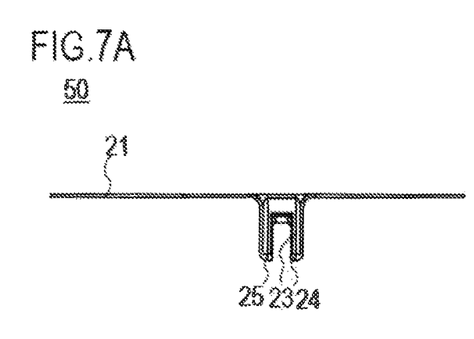
Figure 7B:
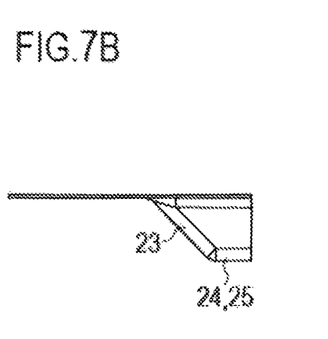
Figure 7C:
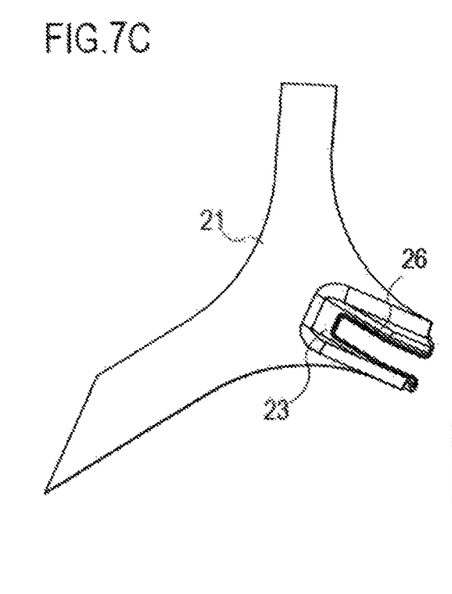
Figure 7D:
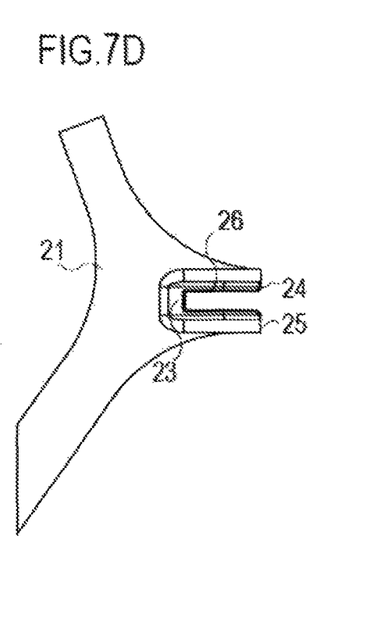

The beam joint portion 22 is a shape joined with the torsion beam 16 at the inner wall (bottom portion) of the torsion beam 16 formed in the U-shape. As illustrated in FIG. 7 (A), the beam joint portion 22 includes an inclined portion 23, extended portions 24, 25, and a rising portion 26. The torsion beam 16 is formed in a U shape in which a cross section has an opening as described later. In order to adjust the rigidity of the connection between the torsion beam 16 and the trailing arm configuration member 11, the inclined portion 23 of the beam joint portion 22 connects the upper connection 21 which is a flat surface shape to a curved surface shape (bottom portion) of the U-shaped torsion beam 16, and extended portions 24, 25 extend in the lateral direction of the vehicle along the curved surface shape from there.

The extended portions 24, 25 extend from the inclined portion 23 to the inner side in the lateral direction of the vehicle. The shape extending from the inclined portion 23 is extending upon branching into two, i.e., the extended portions 24, 25, but the number of branches is not limited to two. As illustrated in FIG. 4, the extended portions 24, 25 are in contact with and joined with the bottom portion, which corresponds to the curved surface, of the U-shaped cross section of the torsion beam 16. It should be noted that the extended portions 24, 25 are located at around a border between a torsion beam open cross section and a closed cross section constituted by the upper member 10 and the lower member 20, and the border portion is more likely to receive stress than the other portion. For this reason, the beam joint portion 22 is preferably grounded and joined with the bottom portion of the torsion beam 30 so as to be disposed along the inner wall of the torsion beam 30 via the inclined portion 23. This is to gradually reduce the closed cross section at the trailing arm side and prevent a rapid change in the cross section. Also, when an external input such as torsion is input into the torsion beam, the beam joint portion 22 is grounded to the bottom portion of the torsion beam 16 where the amount of displacement is relatively smaller as compared with the upper edge portion of the U-shaped cross section of the torsion beam 16 where the amount of displacement is larger, so that the stress concentration can be reduced. Further, welding joined with the torsion beam 16 at the extended portions 24, 25 are preferably not discontinuous, and preferably continuous to around the collar 30 and around the spindle 40 (see a chain double-dashed line P1 of FIG. 2 (B)). This is to prevent the stress from being concentrated on the discontinuous portion when the welding becomes discontinuous.

The rising portion 26 is formed along the inner edge in the inclined portion 23 and the extended portions 24, 25. For example, when the blank of the flat plate shape is seen in the direction of FIG. 5, the rising portion 26 is formed by performing punching to form the extended portions 24, 25 and thereafter raising the formed edge portion. The extended portions 24, 25 adjusts the rigidity of the connection from the trailing arm 50 to the torsion beam 16, but the rigidity can be further strengthened by forming the rising portion 26.

The torsion beam 16 is a beam of which lower side is open when mounted on the vehicle, and the torsion beam 16 is the beam of which cross section is in a U shape. The torsion beam 16 is disposed between the trailing arms 50, and the end portions at the right and the left are joined with the trailing arm configuration members 11.

The spring seat 17 is a fixing end portion in which a spring is fixed to support the vehicle body with elasticity. Depending on the location of installation, the spring seat 17 may reduce the space in the room of the vehicle body, and therefore, for example, as illustrated in FIG. 2 (A), FIG. 2 (B), the spring seat 17 is preferably provided at around the crossing portion between the torsion beam 16 and the trailing arm 50.

The upper member 10 and the lower member 20 are constituted by, for example, hot-rolled sheet steel, and the plate thickness of each plate member is formed to be about 1, 2 mm, but the upper member 10 and the lower member 20 are not limited thereto.

Subsequently, the actions and effects of the present embodiment will be explained. In the torsion beam suspension, the connection between the vehicle body and the tire is formed on the trailing arm, but the torsion beam is in a shape such as a beam just as indicated by its name, and therefore, because of the change in the cross sectional shape at a connection portion from the trailing arm to the torsion beam, the rigidity rapidly changes and stress concentration is likely to occur.

In contrast, the torsion beam suspension 100 according to the present embodiment, the lower member 20 is configured to include not only the upper connection 21 but also the beam joint portion 22 joined with the torsion beam 16 extending from the upper connection 21 to the bottom portion of the torsion beam 16 of the U-shaped cross section. Therefore, the beam joint portion 22 can reduces or suppress the phenomenon that the torsion beam 16 deforms to the inside of the U-shaped cross section, and therefore, this can prevent a rapid change in the rigidity at the connection of the torsion beam 16 from the trailing arm 50, and can prevent or suppress phenomenon such as stress concentration.

The beam joint portion 22 is welded and joined at the inner wall of the torsion beam 16. Therefore, the joint with the torsion beam 16 can be made easily and rigidly.

The beam joint portion 22 is configured to include the rising portion 26 made by raising the edge portion at the inside of the extended portions 24, 25 extending toward the bottom portion of the torsion beam 16 from the upper connection 21. Therefore, this can further improve the rigidity from the trailing arm 50 to the torsion beam 16 with the extended portions 24, 25 constituting the beam joint portion 22.

The present invention is not limited to the above embodiment, and various changes can be made within the claims.

Figure 8:
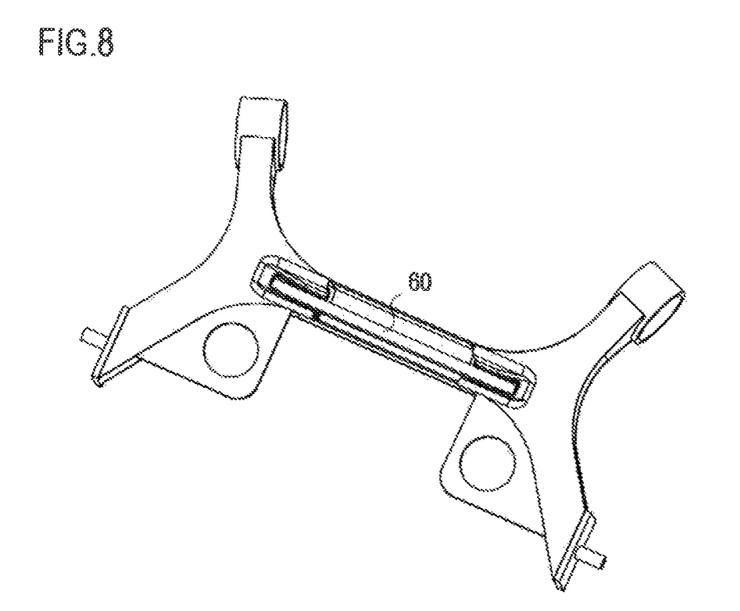
FIG. 8 is a perspective view illustrating a modification of a torsion beam suspension according to the present invention.
Figure 9:
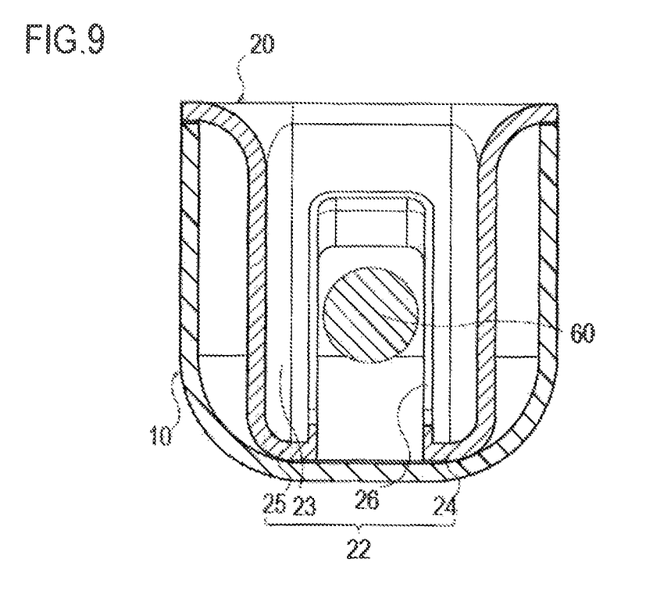
FIG. 9 is a cross sectional view illustrating a torsion beam suspension of FIG. 8 taken along at the same position as FIG. 4.
Figure 10A:
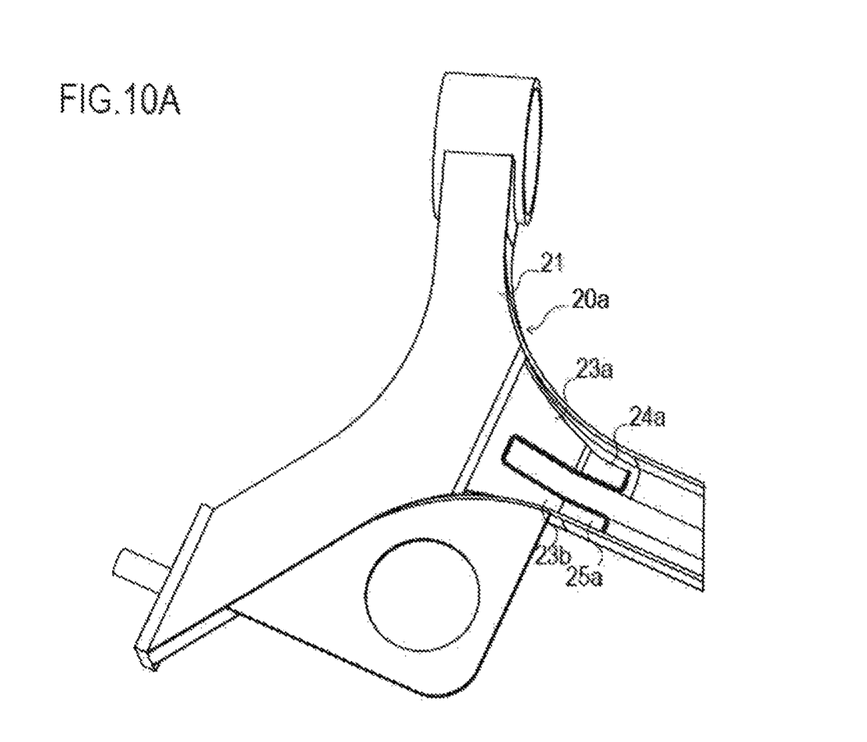
Figure 10B:
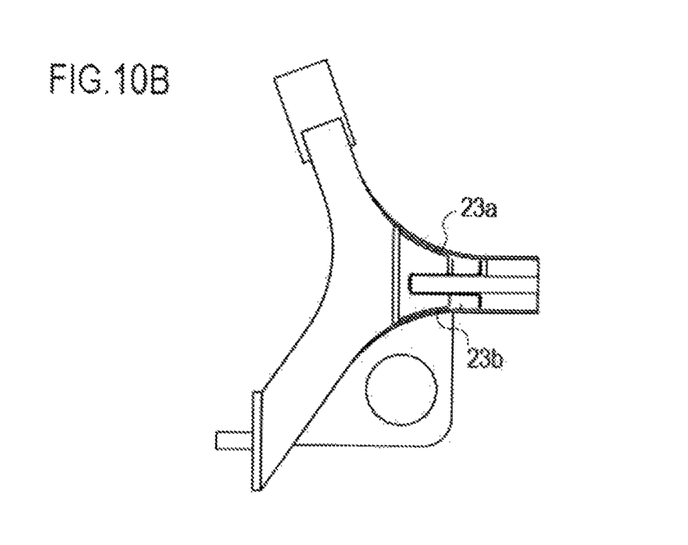

FIG. 8 is a perspective view illustrating a modification of a torsion beam suspension according to an embodiment of the present invention. FIG. 9 is a cross sectional view illustrating a torsion beam suspension of FIG. 8 taken along at the same position as FIG. 4. FIG. 10 (A), (B) are a partial perspective view and a partial bottom view according to a modification of a lower member.

Inside of the torsion beam 16, a stick shaped member (also referred to as a roll bar and the like, and corresponding to rigidity strengthening member) 60 adjusting the torsional rigidity of the torsion beam 16 may be configured to be arranged to be inserted between the extended portion 24 and the extended portion 25. With this configuration, the rigidity of the connection from the trailing arm 50 to the torsion beam 16 can be further improved. The rigidity strengthening member 60 is disposed to be inserted between the extended portion 24 and the extended portion 25, so that the rigidity from the trailing arm 50 to the torsion beam 16 can be adjusted by the lower member 20 and the rigidity strengthening member 60.

In the explanation about the embodiment, in the beam joint portion 22, the extended portion 24, 25 are joined at the bottom portion of the torsion beam 16, but the invention is not limited thereto. More specifically, in FIG. 10 (A), FIG. 10 (B), the lower member 20a includes the upper connection 21, the inclined portions 23a, 23b, and the extended portions 24a, 24b extending from the inclined portions 23a, 23b to the inside. It may be possible to configure to continuously join from the edge portion of the upper connection 21 to the contact portion with the inclined portions 23a, 23b and the extended portions 24a, 24b of the lower member 20a at the side surface side of the torsion beam 16. With this configuration, a stress is not concentrated on a particular portion from the trailing arm 50 to the torsion beam 16, and the stress can be distributed, and the reliability of the torsion beam suspension can be further improved.

REFERENCE SIGNS LIST

10: upper member (first member),
100: torsion beam suspension,
11: trailing arm configuration member,
12: vehicle body connection,
13: tire connection,
14: spring connection,
15: beam connection,
16: torsion beam,
17: spring seat,
18: cross sectional shape change portion,
20, 20a: lower member (second member),
21: upper connection (closing portion),
22: beam joint portion (joint portion),
23, 23a, 23b: inclined portion,
24, 25, 24a, 25a: extended portion (branch shape),
26: rising portion,
30: collar,
40: spindle,
50: trailing arm,
60: roll bar (rigidity strengthening member).

The invention claimed is:
1. A torsion beam suspension comprising:
a first member having an opening in which a cross section is formed in a U shape; and
a pair of second members coming into contact with the first member at an edge portion of a U-shaped cross section of the first member, and disposed in a lateral direction when mounted on a vehicle,
the torsion beam suspension comprising:
right and left trailing arms configured to include a pair of configuration member disposed at right and left when the first member is mounted on the vehicle and the pair of second members, and configured to extend in a longitudinal direction of a vehicle body and to be swingable in a vertical direction; and
a U-shaped torsion beam which is disposed between the pair of configuration members of the first member and in which a cross section has the opening, wherein the second members include a closing portion for closing the opening of the configuration members and a joint portion inclined from the closing portion to a bottom portion of the U-shaped cross section of the torsion beam and joined with the torsion beam, and the joint portion includes a rising portion formed by raising a shape of the joint portion extending from the closing portion.

2. The torsion beam suspension according to claim 1, wherein the joint portion is welded and joined with the torsion beam at an inner wall of the torsion beam.

3. The torsion beam suspension according to claim 1, wherein the first member is joined with the second members continuously from the closing portion to the joint portion.

4. The torsion beam suspension according to claim 1, further comprising a rigidity strengthening member adjusting a rigidity of the torsion beam disposed in the U-shaped cross section of the torsion beam.

5. The torsion beam suspension according to claim 4, wherein the joint portion has a branch shape branching into two or more from the closing portion, and the rigidity strengthening member is disposed to be inserted between the plurality of branch shapes.

\* \* \* \* \*